United States Patent
Lucas et al.

(10) Patent No.: US 10,016,689 B2
(45) Date of Patent: Jul. 10, 2018

(54) SYNCHRONIZED VIDEO WITH IN GAME TELEMETRY

(71) Applicant: Electronic Arts Inc., Redwood City, CA (US)

(72) Inventors: Alexander Brian Marshall Lucas, Edmonton (CA); Matthew Frederick Church, Edmonton (CA); Curtis Aaron Onuczko, Edmonton (CA); Jonathan David Cooper, Edmonton (CA); Michelle Daphne Naylor, Edmonton (CA); Tulay Tetiker McNally, Edmonton (CA); Gavin Vankosky, Edmonton (CA)

(73) Assignee: ELECTRONIC ARTS INC., Redwood City, CA (US)

( * ) Notice: Subject to any disclaimer, the term of this patent is extended or adjusted under 35 U.S.C. 154(b) by 109 days.

(21) Appl. No.: 15/076,408

(22) Filed: Mar. 21, 2016

(65) Prior Publication Data

US 2017/0266568 A1    Sep. 21, 2017

(51) Int. Cl.
*A63F 13/86*    (2014.01)
*A63F 13/497*    (2014.01)

(52) U.S. Cl.
CPC ............ *A63F 13/86* (2014.09); *A63F 13/497* (2014.09)

(58) Field of Classification Search
CPC .......................... A63F 13/497; A63F 2300/634
See application file for complete search history.

(56) References Cited

U.S. PATENT DOCUMENTS

| | | |
|---|---|---|
| 5,395,242 A | 3/1995 | Slye et al. |
| 6,699,127 B1 | 3/2004 | Lobb et al. |
| 7,214,133 B2 | 5/2007 | Jen et al. |
| 8,405,662 B2 | 3/2013 | Russell et al. |
| 8,423,164 B2 | 4/2013 | Jaeger |
| 8,591,332 B1 | 11/2013 | Bright et al. |
| 8,870,661 B2 | 10/2014 | Perry et al. |
| 9,005,033 B2 | 4/2015 | Figueroa |
| 9,064,043 B2 * | 6/2015 | Cathro ................ G06F 11/3476 |
| 9,171,286 B2 * | 10/2015 | Bhogal ................. G06Q 10/10 |
| 9,248,374 B2 | 2/2016 | Watson et al. |
| 9,272,209 B2 * | 3/2016 | Perlman .................. A63F 13/12 |
| 9,393,486 B2 | 7/2016 | George |
| 9,409,083 B2 | 8/2016 | George |
| 9,474,973 B2 | 10/2016 | Perry et al. |
| 2006/0030407 A1 | 2/2006 | Thayer |

(Continued)

*Primary Examiner* — Jay Liddle
(74) *Attorney, Agent, or Firm* — Knobbe, Martens, Olson & Bear, LLP

(57) ABSTRACT

Systems and methods for analyzing a game application are disclosed. While the game application is executed in a gameplay session, embodiment of the systems and methods can acquire data associated with the game application. The data acquired during the gameplay session may be associated with a session identifier. Different types of data (such as telemetry data and video data) can be linked together using the timestamps of the gameplay session. A user can choose a timestamp of the gameplay session to view the data associated with that timestamp. In certain embodiments, the systems and methods can associate an event with one or more timestamps. When a user chooses the event, the systems and methods can automatically display event data starting from the beginning of the event.

19 Claims, 7 Drawing Sheets

(56) References Cited

U.S. PATENT DOCUMENTS

| | | |
|---|---|---|
| 2006/0148571 A1 | 7/2006 | Hossack et al. |
| 2007/0060359 A1 | 3/2007 | Smith |
| 2007/0294089 A1* | 12/2007 | Garbow ................. A63F 13/12 |
| | | 705/26.1 |
| 2009/0048023 A1* | 2/2009 | Wang ..................... H04L 67/38 |
| | | 463/42 |
| 2009/0118018 A1* | 5/2009 | Perlman ................. A63F 13/12 |
| | | 463/42 |
| 2009/0258708 A1 | 10/2009 | Figueroa |
| 2010/0069159 A1 | 3/2010 | Yamada et al. |
| 2013/0084985 A1 | 4/2013 | Green et al. |
| 2013/0172086 A1 | 7/2013 | Ikenaga |
| 2014/0094313 A1 | 4/2014 | Watson et al. |
| 2016/0027143 A1* | 1/2016 | Amidei .................... G06T 1/20 |
| | | 345/522 |
| 2016/0236087 A1 | 8/2016 | McNeil et al. |
| 2017/0001111 A1 | 1/2017 | Willette et al. |
| 2017/0001119 A1 | 1/2017 | Perry et al. |

* cited by examiner

SYNCHRONIZED VIDEO WITH IN GAME TELEMETRY

BACKGROUND

Video game applications have increased in popularity and complexity in recent years. Today's game applications have many more features and can sometimes be much more difficult to debug than game applications of the past. Game developers can use bug reports obtained from play testers and other systems to detect and diagnose gameplay issues or bugs within a game application. Even with bug reports, it can be difficult to identify and replicate bugs within a game application. As a result, game developers may spend a lot of effort and time diagnosing and attempting to fix bugs in the game application.

SUMMARY OF EMBODIMENTS

The systems, methods, and devices of this disclosure each have several innovative aspects, no single one of which is solely responsible for the all of the desirable attributes disclosed herein.

An embodiment discloses a system comprising: at least one data store comprising gameplay data associated with a game application; and a remote computing system in electronic communication with the at least one data store and configured to execute a game application analysis system, the game application analysis system configured to: establish electronic communication with a gameplay session of a game application executing on a first computing system; generate a session identifier for the gameplay session; receive video data associated with the gameplay session; associate the video data with the session identifier of the gameplay session, wherein the video data comprises a plurality of timestamps; receive telemetry data associated with the gameplay session; associate the telemetry data with the session identifier of the gameplay session, wherein the telemetry data comprises a plurality of gameplay events recorded during the gameplay session, wherein each event of the plurality of gameplay events is associated with at least one timestamp of the plurality of timestamps; and receive a request associated with a gameplay event of the plurality of gameplay events from a second computing system, wherein the request comprises the session identifier and a timestamp associated with the gameplay event; identify first video data associated with the gameplay session based, at least in part, on the session identifier; and provide, to the second computing system, at least a portion of the first video data associated with the gameplay session corresponding to the gameplay event based, at least in part, on the timestamp.

Another embodiment discloses a computer-implemented method comprising: under the control of a computer system comprising computer hardware, the computer system configured with computer executable instructions: establishing electronic communication with a gameplay session of a game application executing on a first computing system; generating a session identifier for the gameplay session; receiving gameplay data associated with the gameplay session, wherein the gameplay data comprises video data and telemetry data; associating the video data with the session identifier of the gameplay session; associating the telemetry data with the session identifier of the gameplay session, wherein the telemetry data comprises a plurality of gameplay events recorded during the gameplay session, wherein each event of the plurality of gameplay events is associated with at least one timestamp of the gameplay session; receiving a request associated with a gameplay event of the plurality of gameplay events from a second computing system, wherein the request comprises the session identifier and a timestamp associated with the event; identifying first video data associated with the gameplay session based at least in part on the session identifier; and providing to the second computing system the video data associated with the gameplay session corresponding to the gameplay event based at least in part on the timestamp.

Another embodiment discloses a non-transitory computer-readable storage medium having stored thereon instructions that, when executed, direct a computing system to implement a game application analysis system, the game application analysis system is configured to: establish electronic communication with a gameplay session of a game application executing on a first computing system; generate a session identifier for the gameplay session; receive gameplay data associated with the gameplay session, wherein the gameplay data comprises video data and telemetry data; associate the video data with the session identifier of the gameplay session; associate the telemetry data with the session identifier of the gameplay session, wherein the telemetry data comprises a plurality of gameplay events recorded during the gameplay session, wherein each event of the plurality of gameplay events is associated with at least one timestamp of the gameplay session; receive a request associated with a gameplay event of the plurality of gameplay events from a second computing system, wherein the request comprises the session identifier and a timestamp associated with the event; identify first video data associated with the gameplay session based at least in part on the session identifier; and provide to the second computing system the video data associated with the gameplay session corresponding to the gameplay event based at least in part on the timestamp.

Although certain embodiments and examples are disclosed herein, inventive subject matter extends beyond the examples in the specifically disclosed embodiments to other alternative embodiments and/or uses, and to modifications and equivalents thereof.

BRIEF DESCRIPTION OF THE DRAWINGS

Throughout the drawings, reference numbers are re-used to indicate correspondence between referenced elements. The drawings are provided to illustrate embodiments of the subject matter described herein and not to limit the scope thereof.

DETAILED DESCRIPTION

Overview

To debug a game application, game developers can obtain telemetry data during a gameplay session of the game application. The telemetry data may include, for example, a player's position, a character's physical movements, and their associated timestamps, and other information of a game application. Telemetry data of a game application can be used to recreate a game state and to analyze issues during game development. The telemetry data can be presented numerically in table format, charts, or as word descriptions. However, this approach is often difficult for a user (for example, a game developer) to determine what is actually happening with the game application based solely on the numerical data.

Associating telemetry data with video data of the gameplay session can ameliorate this difficulty. During the gameplay session, both telemetry data and video data are recorded. The gameplay session can have a session identifier (session ID). The telemetry data and video data of the gameplay session can both be linked to the same session ID.

The data acquired during the gameplay session may be streamed live to another computing system or stored in a data store. The system described herein can identify an event (for example, a bug or a crash) automatically or based on the user's input (for example, a bug report). The system can associate the telemetry data and the video data with the event based on the session ID and the timestamp of the event. Accordingly, when the user clicks on a timestamp, the system can show the user what is visually and audibly happening in the game application. The system can also provide the user with telemetry data associated with that timestamp. Advantageously, the system can mark one or more timestamps of the event in the recorded video. In some embodiments, the system can automatically show the telemetry data and play the video data from the relevant timestamp when the user selects an event.

Overview of Game Metric Analysis System

Figure 1:
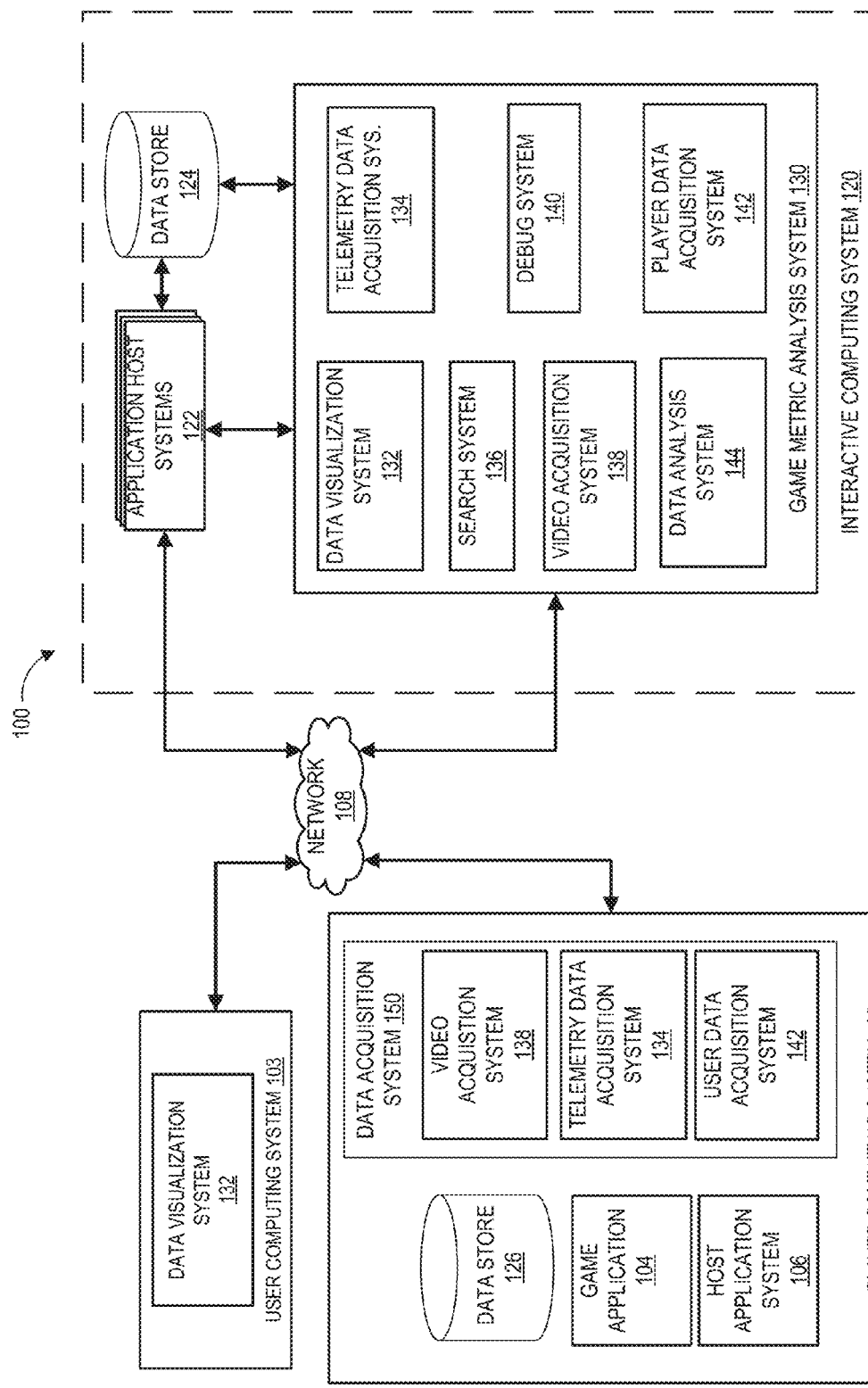
FIG. 1 illustrates an embodiment of a networked computing environment for implementing one or more embodiments of a game metric analysis system.

FIG. 1 illustrates an embodiment of a computing environment 100 for implementing a game metric analysis system 130. The environment 100 includes a network 108, a player computing system 102, an user computing system 103, and an interactive computing system 120. To simplify discussion and not to limit the present disclosure, FIG. 1 illustrates only one player computing system 102, one user computing system 103, and one interactive computing system 120, though multiple systems may be used.

The interactive computing system can include application host systems 122, one or more data stores 124, and a game metric analysis system 130. The game metric analysis system 130 can communicate with data store 124 and/or with the application host systems 122 to acquire data associated with a game application. The game metric analysis system 130 can communicate with user computing system 103, and player computing system 102 via the network 108. Although only one network 108 is illustrated, multiple distinct and/or distributed networks 108 may exist.

One or more of the systems described herein may be associated with the analysis of a game application 104. For example, the player computing system 102 can be configured to run the game application 104 and acquire data for the game application 104. The user computing system 103 can be configured to show analyses of the game application 104. The interactive computing system 120 may process the data acquired by the player computing system 102 and communicate the results of the data analyses to the user computing system 103.

A game developer may use the player computing system 102 to acquire data of the game application 104 and use the user computing system 103 to debug problems encountered during the game application 104. In some embodiments, a game tester may run a game application 104 on the player computing system 102. The data acquisition system of the player computing system 102 can capture data associated with a gameplay session of the game application 104. A game developer may review the captured data of a gameplay session of the game application (during runtime or afterwards) and analyze issues that occurred during the execution of the game application 104. In some embodiments, a player may execute a game application 104 on the player computing system 102. Users, such as game developers or customer service personnel, may use user computing system 103 to analyze issues in a player's gameplay session.

In some embodiments, the game metric analysis system 130 can be associated with a video hosting service to provide access to gameplay information associated gameplay sessions of players. In some embodiments, the video hosting service may be a service associated with the application host systems 122 or interactive computing system 120. In some embodiments, the video hosting service may be a third party service that interfaces with the game metric analysis system 130. The video hosting service can provide a public video interface for users to access gameplay data, such as telemetry data and video data, associated with player's gameplay sessions. The game metric analysis system 142 may identify events, such as achievements, milestones, content played, and the like, from gameplay sessions. A user accessing the video hosting service may be able to view specific achievements or other game events of interest that occur during gameplay sessions. The data visualization system 132 can provide an interface for the user to search and choose an event to review on a user computing system 103. The user computing system 103 can communicate with the interactive computing system 120 through the data visualization system 132 in order to retrieve video data associated with the event. The video data associated with the event can retrieved and can be displayed at the specific time that the event occurs during the gameplay session. For example, a person may want to view how someone earned an achievement for defeating a specific boss within a game application. The person may select the event and the data visualization system 132 can display the video of the gameplay session at the moment that the person received the achievement or at a specific time associated with the achievement, such as defined amount of time before the achievement was earned.

For purposes of the present disclosure, the term "player" can refer to a person that is playing or otherwise operating game application during a gameplay session. For example, the player computing system 102 can refer to the computing system operated by the player providing gameplay session data to the interactive computing system 120 through the data acquisition system 150. The term "user" can refer to a person that is accessing the game metric analysis system 130 to view gameplay data associated player's gameplay sessions through the data visualization system 132. Though illustrated as separate systems, the player computing system 102 and the user computing system 103 can be the same computing system depending on whether the system is providing the gameplay session data or accessing the gameplay session data through the data visualization system 132.

A. Interactive Computing System

In the illustrated embodiment, the interactive computing system 120 includes application host systems 122, a data store 124, and a game metric analysis system 130. These systems may communicate with each other. For example, the game metric analysis system 130 can obtain data associated with a game application from the application host systems 122 and can store such data in the data store 124. The application host systems 122 can communicate with the data store 124 to execute and/or host a game application. In certain embodiments, the interactive computing system 120 may be associated with a network-based video service.

1. Application Host Systems

The application host systems 122 can be configured to execute a portion of the game application 104 and/or host application 106. In certain embodiments, instead of or in addition to executing a portion of the game application 104 and/or host application 106, the application host systems 122 may execute another application, which may complement and/or interact with the game application 104 during execution of an instance of the game application 104. Further details regarding application host systems are described below.

The interactive computing system 120 may enable multiple players or computing systems to access a portion of the game application 104 and/or host application 106 executed or hosted by the interactive computing system 120. In some embodiments, the portion of the game application 104 executed by application host systems 122 of the interactive computing system 120 may create a persistent virtual world. This persistent virtual world may enable one or more players to interact with the virtual world and with each other in a synchronous and/or asynchronous manner. In some cases, multiple instances of the persistent virtual world may be created or hosted by the interactive computing system 120. A set of players may be assigned to or may access one instance of the persistent virtual world while another set of players may be assigned to or may access another instance of the persistent virtual world. In some embodiments, the application host systems 122 may execute a hosting system for executing various aspects of a game environment. For example, in one embodiment, the game application 104 may be a competitive game, such as a first person shooter or sports game, and the host application system 122 can provide a dedicated hosting service for hosting multiplayer game instances or facilitate the creation of game instances hosted by player computing devices. In some embodiments, the application host systems 122 can provide a lobby or other environment for players to virtually interact with one another. Such environments may include environments for conducting transactions between players, such as an auction house or type of environment for facilitating transactions.

2. Game Metric Analysis System

As described with respect to other systems in FIG. 1, the game metric analysis system 130 can communicate with other systems to acquire data associated with a game application and to analyze the data. The game metric analysis system can include one or more systems for data acquisition and analysis. For example, the game metric analysis system 130 can include a data visualization system 132, a telemetry data acquisition system 134, a search system 136, a video acquisition system 138, a debug system 140, a player data acquisition system 142, and a data analysis system 144. These example systems are not intended to be limiting. The game metric analysis system 130 may include fewer or more systems as described. For example, in some embodiments, the interactive computing system may not have a player data acquisition system 142. In other embodiments, the game metric analysis system 130 may include more systems and/or functionalities that facilitate the acquisition of game data and the analysis of a game application.

The game metric analysis computing system 130 and its various systems may be distributed across multiple computing systems. The various systems of the game metric analysis system can communicate with each other to obtain and analyze data associated with a game application. For example, a portion of the video acquisition system 138 may be executed by the player computing system 102, while another portion of the video acquisition system 138 may be executed by the interactive computing system 120. The video acquisition system 138 of the game metric analysis system 130 may communicate with the video acquisition system 138 of the player computing system 102 to acquire video data. The video acquisition system 138 of the interactive computing system 120 may generate a session ID for a particular game session. The video acquisition system 138 of the player computing system 102 may be a plug-in to the game application 104 and acquire video data of the game's execution. In other embodiments, the video acquisition system 138 may be entirely implemented by the player computing system 102. The video acquisition system 138 can communicate the acquired video to the data visualization system 132 to generate user interface data to display the video.

A gameplay session may be associated with a start time and an end time. The start time may be the time when the game application begins to be recorded. The end time may be the time when the recording of the game application is terminated, for example, by a player or by a crash. The gameplay session may have multiple timestamps in-between the start and the end time. During the gameplay session, the various systems may simultaneously acquire data of the game application at each timestamp. For example, the telemetry data acquisition system may acquire telemetry data of the game application while the video acquisition system may acquire the video data of the game application.

The gameplay session is associated with a session ID. The session ID can be unique to a gameplay session. The session ID may be generated by the one or more systems described herein, such as, for example, the player computing system 102, application host systems 122, the game metric analysis system 130, or the like. The session ID may be based on a variety of information such as, for example, an IP address, a timestamp when the game application begins to be executed, and a player's profile information, in combination or the like. The session ID may be used to link data acquired by different systems during the gameplay session. Advantageously, in some embodiments, data acquired by various systems may be further linked together using the timestamps of the gameplay session. Each system of the game metric analysis system 130 will be described in more detail below.

a. Telemetry Data Acquisition System

Telemetry data acquisition system 134 can be configured to acquire telemetry data during a gameplay session. Telemetry data of a game application can be used to recreate a game state and to analyze issues during game development. Telemetry data may include data specific to the game application such as, for example, the timestamps, character's movements, character's positions, one or more events (for example, an enemy's death in a shooting game), player inputs (for example, buttons pressed), and the like. In some embodiments, the telemetry data acquisition system 134 may also acquire system information associated with the game application. The system information may include performance data such as CPU or memory utilization rate, machine on which the game application is executed, and so on.

Telemetry data can be stored in a variety of database formats. The telemetry data can be transformed into statistics for analyzing and debugging the game application. The telemetry data may be transformed or organized to show various metrics or statistics associated with a game application, such as, for example, average completion time as a function of individual game level, average weekly bug rate, revenue per day, number of active players per day, and so on. These statistics can sometimes be referred to as game metrics.

Telemetry data acquisition system 134 may associate telemetry data acquired during a gameplay session with a session ID. In some embodiments, during a gameplay session, telemetry data acquisition system 134 can acquire telemetry data while the video acquisition system 138 records a video of the gameplay session. The telemetry data can be associated with the video data using the session ID.

b. Video Acquisition System

The video acquisition system 138 can record execution of a game application 104. For example, the video acquisition system 138 may gather video data such as, for example, moving visual images of the gameplay (for example, object's movements), audio data (for example, sound of bombing or shooting), system notifications, dialogues, interactions with items, messages among the players, player commentary, web cam footage or the like. The video acquisition system 138 can record the screen of the player computing system during a gameplay. In some embodiments, the video acquisition system 138 may be configured to acquire video data associated with multiple views of a gameplay session. For example, a game application may record a plurality of video capture streams within a gameplay session even though only a single view is displayed to the player at a given time. In some embodiments, visual and audio data may be acquired by separate software and/or hardware.

The data acquired by the video acquisition system 138 may be streamed live by the data visualization system 132. For example, the video acquisition system 138 may gather video data and transmit the video data to the interactive computing system 120. A game developer can view such video data while the game is being played. The video acquisition system 138 may also record the gameplay session, store the recorded video, such as in data store 126, and transmit the recorded data to other computing systems at a later time.

As described with reference to telemetry data acquisition system, the video data may be linked to a gameplay session based on the session ID. During the gameplay session, the video data acquired by the video acquisition system 138 may be associated with a start time and an end time. The start time and end time of the video data may be expressed differently than the start time and end time of the gameplay session. For example, a one minute video of the gameplay session may have the start time as 0 second and end time at 60 seconds. But the start time associated with the gameplay session may be 8:30:00 am while the end time associated with the gameplay session may be 8:31:00 am. In some embodiments, the video data may use the same time expression as the gameplay session.

In-between the start time and end time, the video data can be divided into a plurality of frames. The timestamps may be used to refer to specific frames within the video. In some embodiments, the game metric analysis system 130 can associate an event with certain timestamps of the video data. The event can further be associated with other data, such as telemetry data, in the gameplay session using the session ID and timestamps. For example, the game metric analysis system 130 may record a shooting game application in a gameplay session. During a shooting game, the event may be when a player kills a big boss. The game metric analysis system 130 can identify the timestamps when this event occurs. The game metric analysis system 130 can associate video frames and telemetry data for this event based on the timestamps. The game metric analysis system 130 can also generate user interface data which allows a user to review the event by playing the video from one of the timestamps.

c. Player Data Acquisition System

The player data acquisition system 142 can acquire player profile information, such as, for example, player's age, geographic location, gender, or the like. The player data acquisition system 142 can also acquire information on the player's in-game behaviors, such as, for example, in-game purchase behavior, preference for interacting with other players, and so on. The player data acquisition system 142 may communicate with other systems described herein. For example, the player data acquisition system 142 can communicate with the data store 124 to store information associated with a player account, a player profile, and/or a player computing system. The player data acquisition system 142 can also communicate with the data analysis system 144, the debug system 140, and/or the data visualization system 132, and provide player data to these systems for further analysis.

d. Data Analysis System

The data analysis system 144 can analyze data associated with a game application and generate game metric information. In certain embodiments, data analysis system 144 may be part of the debug system 140. The data analysis system 144 may perform data analyses after a gameplay session. For example, the data analysis system 144 can obtain telemetry data and player profile data from the data store 124 using the session ID associated with the gameplay session. The data analysis system 144 can generate a report on the player's in-game behavior based on the data obtained.

The data analysis system 144 can also analyze data across multiple gameplay sessions. The data analysis system 144 may communicate to the data store 124 multiple session IDs to retrieve data. In some implementations, other identifiers may be used to obtain data. For example, the data analysis system 144 may use player ID, event ID, and/or timestamps in a recorded video to retrieve data.

As described with reference to FIG. 2, the data analysis system 144 can communicate with the data visualization system 132 and present the game metrics data in a variety of formats such as, for example, graphs (for example pie charts, heat maps, tables, line graphs), tables, word descriptions, or the like. In some embodiments, the data analysis system 144 may contain multiple modules where each module is for a certain type of analysis. For example, one module may be used to generate graphs for game metrics data. Another module may be used to analyze the player's in-game purchase behavior. These modules may be implemented as plugins to the game application 104 and/or to the data visualization system 132. The user can customize the data analysis system 144, for example, by adding or removing one or more modules.

e. Debug System

The debug system 140 may be used analyze one or more events of a game application. The events can comprise crashes of the game application, bugs of the game application, user configured actions, moments checkpoints within a game (such as, for example, a touch-down in a football game, shooting an enemy in a first person shooting game, an achievement in the game, and so on). In some embodiments, the event may have one or more event identifiers, such as, for example, bug identifier (bug ID), crash identifier (crash ID), checkpoint number, or the like.

The debug system 140 may be configured to receive an event report from a user. In some embodiments, the event report may be a bug report. For example, the user may identify an issue in the game application 104 (for example, the player's avatar is stuck at a certain location) when watching the recorded video obtained by the video acquisition system 138. The user may file a bug report via the user computing system 103. The bug report may contain information associated with the issue such as, for example, description of the bug, player's position in the game, timestamp of the issue, session ID, or the like. The debug system 140 may generate a bug ID associated with the bug report filed by the user.

In some embodiments, the debug system 140 can automatically detect an event in the game application 104. For example, the debug system 140 may be configured to monitor crashes of the game application 104. The debug system 140 may generate a crash ID (which may or may not be the same as the bug ID) associated with a crash. The debug system 140 can compile information associated with the crash such as decoded call stack, crash ID, session ID, or the like. Such information may be used by other systems such as the debug system 140 and/or the data visualization system 132, to facilitate diagnosis of the crash.

Advantageously, the debug system 140 can organize and associate data obtained from different systems. The debug system 140 can make such associations based on one or more identifiers, such as, for example, session ID of the game session. For example, the debug system 140 may associate telemetry data with video data using the session ID of the gameplay session. The debug system 140 can further assemble information of an event using timestamps in the gameplay session. For example, the debug system 140 may receive event information which may include an event description (for example, player cannot move), timestamp (for example, the timestamp of the gameplay session and/or the timestamp of the recorded video), session ID, an event identifier, location information of the player, or the like. The debug system 140 can identify one or more timestamps in the gameplay session based on the information provided for the event. The timestamps can comprise a time interval, discrete time, or a combination. The debug system 140 can use the timestamps to obtain information (such as, for example, telemetry data, or video data) associated with the event.

For example, the user may file a bug report of an error in a character's movement in the game application 104. The bug report may include information such as session ID of the bug, timestamps of the gameplay session where the bug occurs, and a description of the bug. The debug system 140 can obtain telemetry data and a recorded video using the session ID in the bug report. The debug system 140 can also associate frames of the recorded video with telemetry data at multiple timestamps. The debug system can communicate with the data visualization system 132 to generate a user interface data which show a description of the bug, a game environment map of where the bug occurs, and a video with recorded visual images and/or audio information of the bug. Advantageously, the video may automatically start streaming at the timestamp where the bug occurs.

f. Search System

The search system 136 can communicate with various systems of the game metric analysis system 130 and/or the interactive computing system 120. For example, the search system 136 may communicate with the data visualization system 132 to receive one or more search criteria. The search system can communicate with data store 124 and look up information based on the search criteria. The search system 136 can transmit information obtained from the data store 124 to the data visualization system 132 for the user to view.

The search system 136 can look for one or more events in a gameplay session. The search system 136 can also look for information such as specific types of events, across multiple gameplay sessions. For example, the search system 136 can search for information associated with every touchdown during a football game. The search system 136 can also search for all recorded videos in the past two days.

g. Data Visualization System

The data visualization system 132 can generate a user interface for a user to view data analyses associated with the game application 104. The user interface may include game telemetry data, a bug report, user profile data, a recorded video of a game session, a filtering tool, a search tool, or the like. The filtering tool and/or the search tool may be configured to receive user input and filter data based on the user input. The user interface may be rendered through a web interface (such as a webpage), and/or on an application locally installed on a computing device.

The data visualization system 132 may generate user interface data using one or more user interface templates. With reference to FIG. 2, a user interface template can have multiple modules, such as, for example, a debug information module 240, an event information module 250, a visual game information module 270, a video module 280, an interface control module 260, or the like. The data visualization system 132 may populate the modules using information received from other systems of the game metric analysis system 130.

3. Data Store

The interactive computing system 120 can include a data store 124. The data store 124 can be configured to store data acquired by other systems, such as, for example, telemetry data, video data, user data, or the like. The data store may be distributed across multiple computing devices (see for example computing device 700 in FIG. 7). In some embodiments, the data store 124 may be network-based storage system where data may be stored in different locations.

B. Player Computing System

The player computing system 102 may include hardware and software components for establishing communications over a communication network 108. For example, the user computing system 102 may be equipped with networking equipment and network software applications (for example, a web browser) that facilitates communications via one or more networks (for example, the Internet or an intranet). The player computing system 102 may have varied local computing resources such as central processing units and architectures, memory, mass storage, graphics processing units, communication network availability and bandwidth, and so forth. Further, the player computing system 102 may include any type of computing system. For example, the player computing system 102 may include any type of computing device(s), such as desktops, laptops, game application platforms, television set-top boxes, televisions (for example, Internet TVs), network-enabled kiosks, car-console devices computerized appliances, wearable devices (for example, smart watches and glasses with computing functionality), and wireless mobile devices (for example, smart phones, PDAs, tablets, or the like), to name a few. In some embodiments, the player computing system 102 may include one or more of the embodiments described below with respect to FIG. 7.

1. Game Application and Host Application System

Typically, the player computing system 102 is capable of executing a game application 104, that may be stored and/or executed in a distributed environment. For example, the player computing system 102 may execute a portion of a game and the interactive computing system 120, or an application host system 122 of the interactive computing system 120 may execute another portion of the game. For instance, the game may be a massively multiplayer online role-playing game (MMORPG) that includes a client portion executed by the player computing system 102 and a server portion executed by one or more application host systems 122. For the present discussion, the game application 104 can include a distributed application or an application that includes a portion that executes on the player computing system 102 and a portion that executes on at least one of the application host systems 122. The player computing system 102 may execute a host application system 106. The host application system 106 can be loaded into memory on the player computing system 102 and can act as an interface or hub for one or more game applications 104 that interfaces with the application host system 122.

2. Data Acquisition System

Data acquisition system 150 may be used to acquire data associated with a player and/or game application 104. Data acquisition system 150 can comprise the video acquisition system 138, telemetry data acquisition system 134, and player data acquisition system 142. The data acquisition system 150 can be part of the game metric analysis system 130. As described with reference to game metric analysis system 130, the data acquisition system 150 can acquire telemetry data of a game application (using telemetry data acquisition system 134), video data of the gameplay (using video data acquisition system 138), and/or player profile data (using player data acquisition system 142).

The various systems of the data acquisition system 150 may be implemented by hardware, software or a combination. For example, the systems can be software plug-in to the game application 104, host application system 106, and/or application host systems 122. One or more of the systems can also be a standalone application which can communicate with the game application 104, host application system 106, and/or application host systems 122.

C. User Computing System

The user computing system 103 can be implemented by a computing device as described with reference to FIG. 7. The user computing system 103 can comprise the data visualization system 132. The user computing system 103 can communicate with the player computing system 102 and/or interactive computing system 120 via network 108. In some embodiments, the user computing system 103 may be a part of the player computing system 102 or the interactive computing system 120.

The data visualization system 132 of the user computing system 103 can include a user interface. As described with reference to FIG. 2, the user interface can display one or more game metrics. The game metrics may be shown in various formats such as tables, word descriptions, graphs, or the like. The user interface can display a game environment map such as a player's location or movement direction at a certain timestamp. The user interface can show a video acquired by the video acquisition system 138 during a gameplay.

The data visualization system 132 may be implemented in a variety of ways such as, for example, a website, a mobile page, a plug-in to an application (such as for example, a debug application, a game application, or a host application), and so on. The data visualization system 132 will be described in more detail below.

D. Other Considerations

Although the various systems are described separately, it should be noted that one or more of these systems may be combined together. For example, the user computing system 103 may be combined with player computing system 102. In another example, the search system 136 may be a part of the data visualization system 132. Additionally, one or more of the systems may be executed by the same computing device (see for example, computing device 10 in FIG. 7). For example, the administrative computing system 103 may be executed on the same computing device as the player computing system 102.

On the other hand, one or more systems may be executed by multiple computing devices. For example, a portion of the data visualization system 132 may be implemented by a player's personal computer while another portion may be implemented by a server.

Examples of User Interfaces for Analyzing a Game Application

Figure 2:
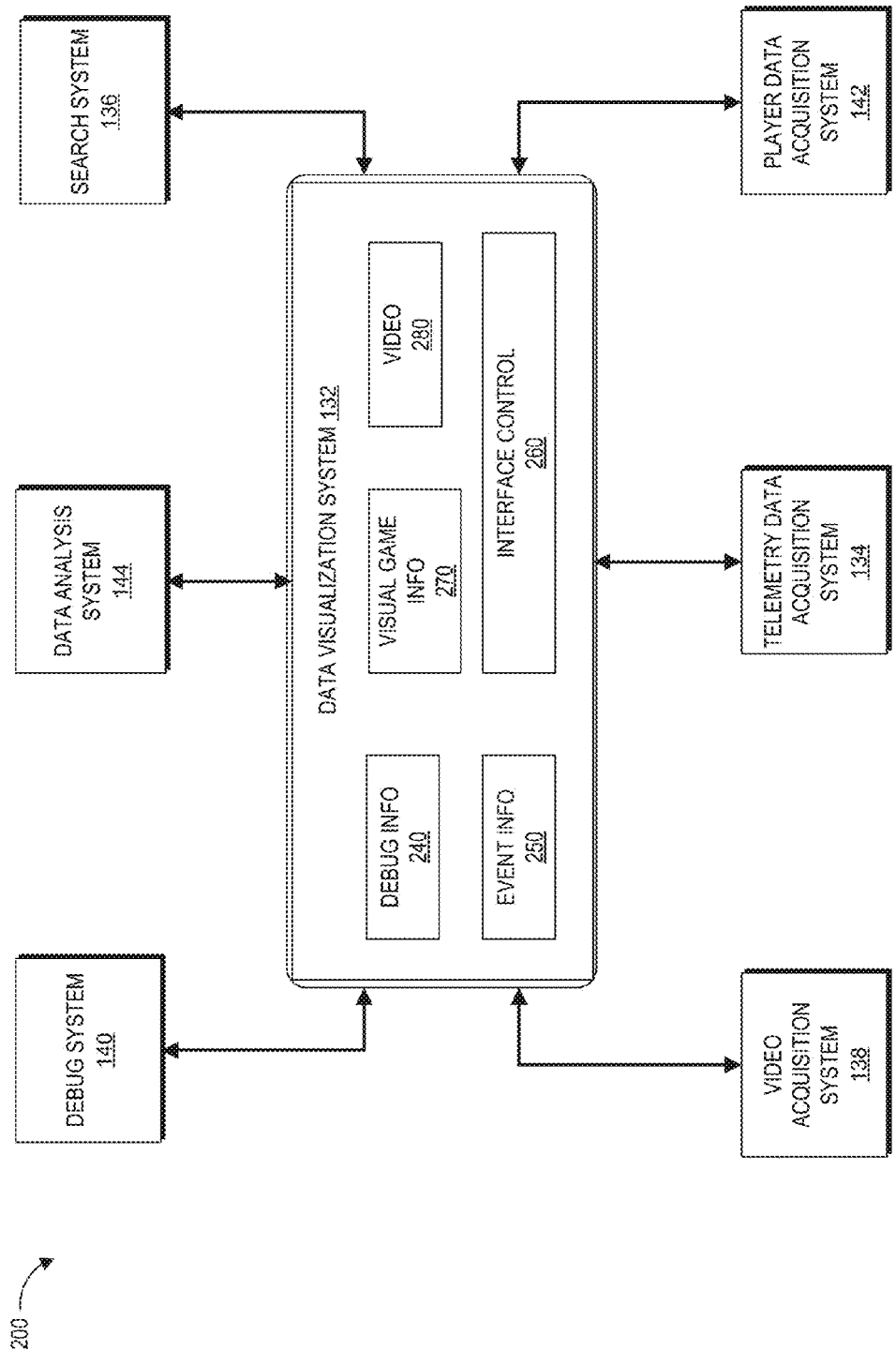
FIG. 2 illustrates an embodiment of interactions of various systems of a game metric analysis system.

FIG. 2 illustrates an embodiment of interactions between a data visualization system and various other systems. As shown in the illustrated embodiment, the data visualization system 132 can communicate with various systems such as, for example, a debug system 140, a data analysis system 144, a search system 136, a video acquisition system 138, a telemetry data acquisition system 134, and/or a player data acquisition system 142. The data visualization system 132 can generate user interface data and transmit the user interface data to be displayed by a computing device (for example, the computing device described with reference to FIG. 7). Each of the systems may be part of a game application (such as, for example, a plug-in of the game application), a host application, a webpage, or a standalone application.

In the illustrated embodiment, the data visualization system 132 includes, for example, a debug information module 240, an event information module 250, a visual game information module 270, a video module 280, an interface control module 260, and so on. These modules can be used to display information received from systems described in FIG. 1.

Although the examples in FIG. 2 are described with reference to various systems and modules, these examples are not limiting. The system 200 may include more or fewer systems and/or modules. For example, in some embodiments, the system 200 may not have a player data acquisition system 142. The data visualization system 132 may include another module that is used to display data generated by the data analysis system. In some implementations, one or more modules may be a part of another module. For example, the debug information module 240 maybe combined with the event information module 250. Similarly, sometimes the search system 136 may be part of the debug system 140.

In some embodiments, the data visualization system 132 can be configured to provide a user interface for users of a video hosting service. The data visualization system 132 may limit the access of public users of the video hosting service to specific modules and defined data associated with gameplay sessions. For example, a user interface of the data visualization system 132 for a video hosting service may include an event information module 250, a visual game information module 270, a video module 280, and an interface control module 260, but may not include a debug information module 240. Additionally, the event information module 250 may have limited access to event information, such as only data associated with certain types of events.

A. Example Interactions Between Data Visualization System and Other Systems a. Interactions Between Data Visualization System and Debug System

The data visualization system 132 can communicate with the debug system 140 and generate user interface data with information of one or more events in a game application. The data visualization system 132 may receive events identified by the debug system 140. The events may be associated with event IDs and/or session IDs. The data visualization system 132 can obtain information associated with the events from the data store 124 using the event IDs and/or the session ID. The data visualization system 132 can store the obtained information into various modules of the data visualization system 132. For example, the data visualization system 132 can use crash ID and session ID to retrieve telemetry data, video data, and decoded call stack information for a crash in a gameplay session. The data visualization system 132 may store the decoded call stack information into the debug information module 240, the telemetry data information into the visual game information module 270 and/or event information module 250, and video data into the video module 280.

As described with reference to FIG. 1, telemetry data and video data of a gameplay session may be linked using the timestamps of the gameplay session. Advantageously, video module 280 of the data visualization system 132 can automatically play a recorded video from a timestamp when the event occurs. The data visualization system 132 can also show the telemetry data together with the video data when the video is streamed. In some embodiments, the data visualization system 132 may allow the user to choose a timestamp of the video and view the data associated with that timestamp. For example, when a user clicks on a timestamp of the video, the data visualization system 132 can display video data and telemetry data associated with that timestamp.

In certain implementations, a portion of the debug system may be implemented by the interface control module 260. For example, the interface control module 260 can include one or more user interface elements for a user to fill out and submit information (for example, location, timestamp, description, game session, and so on) of a bug in the game application 104. This is particularly advantageous because a game developer may identify one or more bugs while reviewing the video of a gameplay session.

b. Interactions Between Data Visualization System and Data Analysis System

The data visualization system 132 can communicate with data analysis system 144 and display game metrics in a variety of formats such as, for example, graphs (for example pie charts, heat maps, tables, line graphs), tables, word descriptions, and so on. The data visualization system 132 may display such data analyses using one or more modules such as debug information module 240, event information module 250, or the like.

In some embodiments, the data visualization system 132 may include one or more plug-ins for rendering game metric analyses in certain formats. For example, the data visualization system 132 may have a plug-in that can allow the data visualization system 132 to display game data using a heatmap.

c. Interactions Between Data Visualization System and Search System

The data visualization system 132 can include a user interface control module 260 which allows the user to search and filter data. The user interface control module 260 can include a search tool allowing a user to input search queries and receive data based on the search queries. For example, the user may provide a bug ID and a session ID in a search query. The interface control module 260 can communicate the bug ID and the session ID to the search system 136. The data visualization system 132 can receive from the search system 136, data such as, for example, telemetry data, video data associated with the bug ID, and the session ID. The data visualization system 132 can then display the video data in the video module 280 and telemetry data in the debug information module 240.

In some embodiments, the user may input a query which causes the data visualization system 132 to receive data associated with multiple gameplay sessions. For example, the user may request a list videos associated with a specific gameplay event (such as a specific boss fight) in the past two days. The data visualization system 132 may receive the session IDs and/or data associated with the list of videos requested by the user.

The interface control module 260 can also include a filtering tool. The filtering tool can allow a user to choose one or more sets of data the user is interested in. The filtering tool may be applied to various data such as, for example, game metrics data, video data, telemetry data, player profile data, or the like. The user interface control module 260 may display one or more options from which the user can choose for filtering. For example, the options may include, timestamps, events, session IDs, and so on. In some embodiments, the user interface control module 260 can also allow the user to directly input filtering criteria.

The interface control module 260 may communicate with one or more systems such as debug system 140, data analysis system 144, or search system 136 to retrieve data based on the filtering criteria. In some embodiments, the data visualization system 132 may display only a portion of the data obtained from the various systems based on the filtering criteria.

d. Interactions Between Data Visualization System and Data Acquisition System The data visualization system 132 can communicate with data acquisition system 150 to generate user interface data with the data acquired by the data acquisition system 150. For example, the data visualization system 132 can display the video data acquired by the video acquisition system 138. The data visualization system 132 can display the video data in the video module 280. As described with reference to FIG. 1, the video may include one or more timestamps associated with certain events. The user may choose to watch the video beginning at a timestamp associated with one of the events.

The data visualization system 132 may display raw telemetry data acquired by the telemetry data acquisition system 134. In some embodiments, the data acquisition system 132 may display telemetry data processed by other systems such as, for example, data analysis system 144, and/or debug system 140. The data visualization system 132 may display telemetry data in one or more modules, such as, for example, debug information module 240, event information module 250, or visual game information module 270.

Similarly, the data visualization system 132 can display player profile data acquired by the player data acquisition system 142. The data visualization system 132 can show the player profile data in the visual game information module 270. In some embodiments, the data visualization system 132 may display the player profile data after the data is processed by the data analysis system 144.

In certain implementations, the filtering tool of the interface control system 260 can receive filtering criteria from a user and display only certain types of data acquired by the data acquisition system 150.

B. Examples Embodiments of User Interfaces

Figure 3:
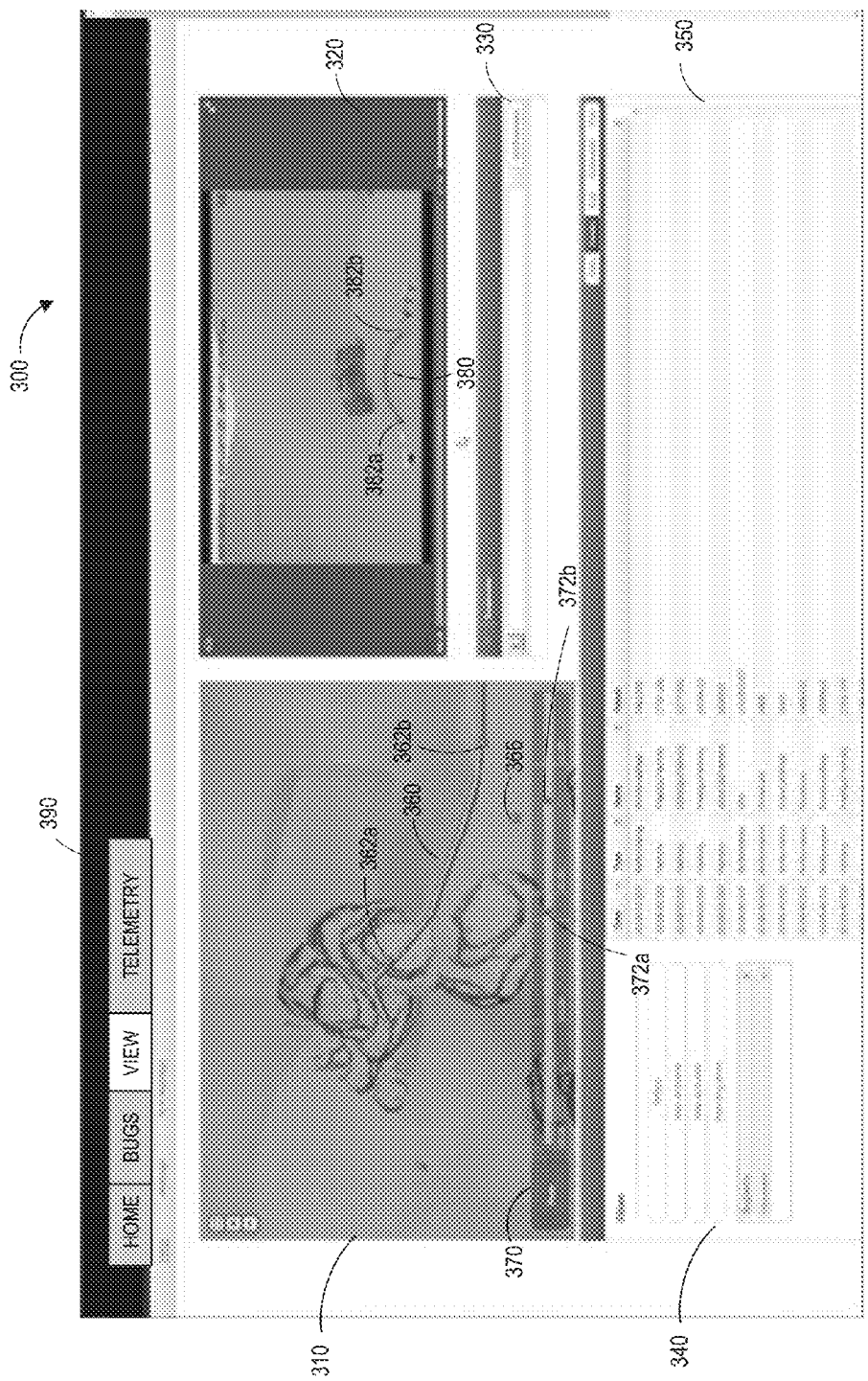
FIGS. 3 and 4 illustrate embodiments of a data visualization system.
Figure 4:
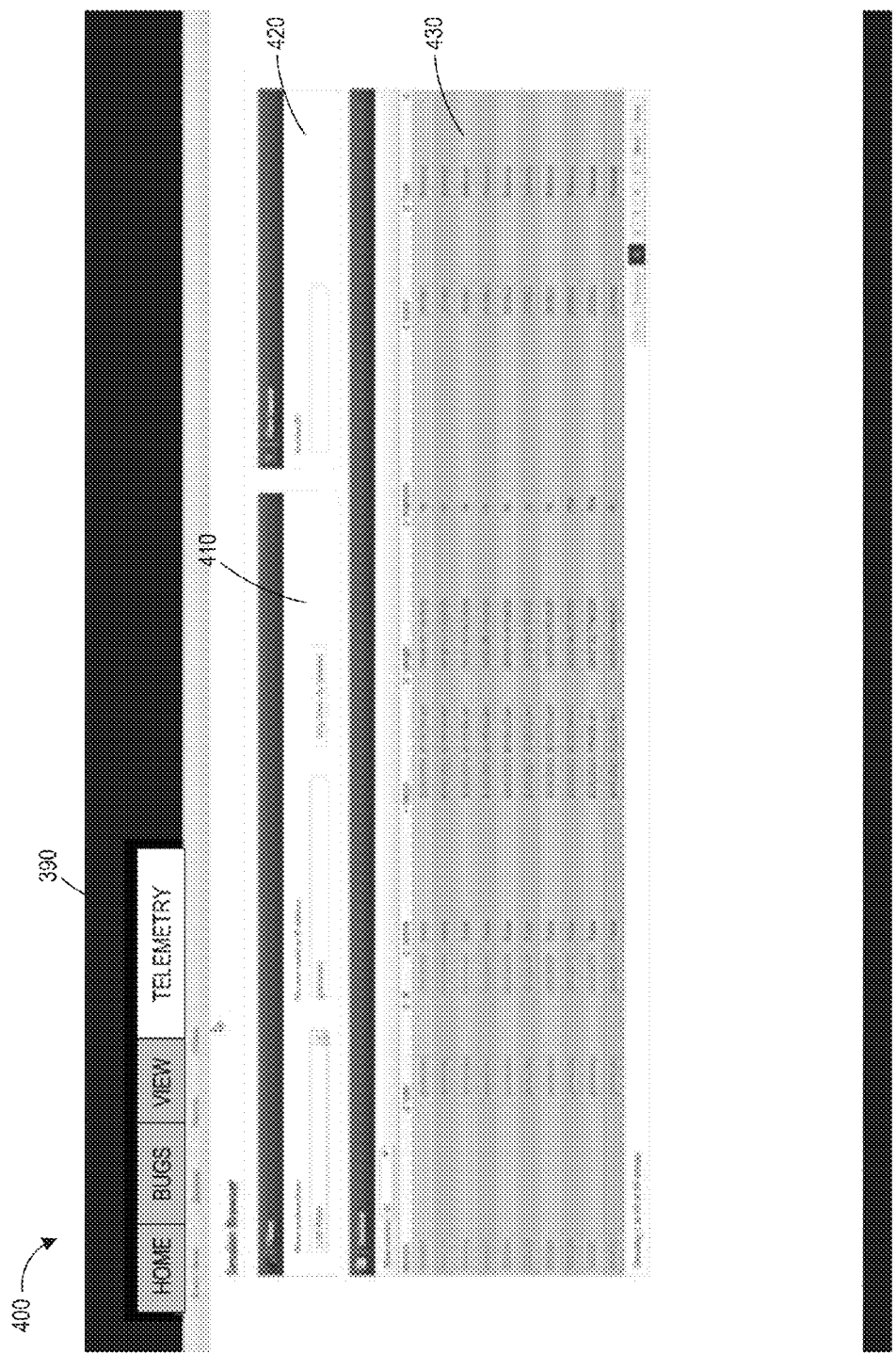

FIGS. 3 and 4 are examples of user interfaces implementing the data visualization system. The user interface may be a webpage or an application on a computing device 10. The user interface may comprise a tab 390 which allows the user to choose among different types of views. For example, the tab 390 in FIG. 3 can include a home view which may provide a summary of information associated with the game application 104, a bugs view which includes information associated with bugs in the game application 104 (such as bug ID, session ID, and bug description), an event information view which shows events information of a gameplay session, and a telemetry view which provides a summary of telemetry data as described in FIG. 4. The data visualization system may generate the tab 390 based on various factors such as: types of games, types of events, types of computing device (for example, Xbox v. PC), user's preference, in combination or the like. The user can configure the tab 390 by adding or deleting one or more views. In some embodiments, the user can also configure one or more modules (such as, for example, as described in FIG. 2 with reference to data visualization system 132) within a view.

In FIG. 3, the user interface 300 illustrates data associated with a gameplay session. The illustrated embodiment includes a game environment map 310, a video player interface 320, a bookmark bar 330, a filtering tool 340, and an event module 350. Elements of the gameplay session can be shown on a game environment map 310. Video data of the gameplay session can be shown on video player interface 320.

The event module 350 can include a list of events associated with the gameplay session. For example, as shown in FIG. 3, the event module 350 may include the date, time, type, and description of the event. The user can obtain more details about an event by clicking on the event in the event module. For example, the data visualization system 132 may take the user to a page with error details when a user clicks on an error in the event module.

The game environment map 310 can provide a map of the game environment. The types of game environment map 310 can vary based on characteristics of the game application. For example, if the game application is a two-dimensional (2D) game, the game environment map 310 may include a 2D map of the game application. If the game application is a three-dimensional (3D) game, the game environment map 310 may include 2D and 3D maps of the game application.

The game environment map 310 can provide visual indications associated with events from the gameplay session. For example, in the illustrated embodiment, the game environment map 310 includes one or more positions (for example, positions 362a, 362b, 366) of the character and a movement trajectory 360. The game environment map 310 may be updated at different timestamps of the gameplay sessions. Accordingly, in some embodiments, the game environment map 310 may comprise a video of changes in the game environment during the gameplay session.

The timeline bar 372 of the user interface 300 provides timestamps of the gameplay session. The timeline 372 can allow the user to view the game environment map 310 at different points in time in the game play session. For example, the timestamp 372a can correspond to character's position 362a while the timestamp 372b can correspond to character's position 362b on the game environment map 310.

The timestamps of the gameplay session can also correspond to video data captured during the gameplay session. For example, the trajectory 380 can show the movements of the character in the game environment. The trajectory 380 has a starting point 382a and an end point 382b. The video data and the game environment map 310 may be linked using the timestamps of the gameplay session. For example, the trajectory 380 in the recorded video may relate to the trajectory 360 on the game environment map 310. At timestamp 372a, the character is at position 362a on game environment map 310 while the same character is at position 382a in the recorded video. Similarly, the timestamp 372b corresponds to position 362b on the game environment map 310 and corresponds to position 382b in the recorded video.

Advantageously, when the user clicks the timestamp 372a, the data visualization system may begin to play the recorded video where the character is located at the starting point 382a. At the same time, the data visualization system may also show changes to the game environment map beginning at timestamp 372a. In some embodiments, the user may click on a timestamp of the recorded video and the data visualization system can start playing the recorded video and the game environment map 310 at that timestamp. The user may also click on other timestamps of the recorded video and/or the gameplay session 310, for example, to look at the context leading up to the errors.

The bookmark bar 330 can allow the user to add additional context to the video. For example, the user can insert a comment to the video which may be visible to other users who watch the video.

The filtering tool 340 can allow a user to select one or more options in order to view a subset of the data (for example, telemetry data, video data, gameplay data, or the like).

FIG. 4 illustrates another example of user interface. The user interface 400 displays telemetry data information. The data visualization system 132 may display the user interface 400 when a user clicks on telemetry view on the tab 390.

The user interface 400 shows telemetry data in module 430. The telemetry data may comprise date and time of an event, the type of an event, the session ID, the event ID, or the like. The user may click on an entry in the module 430. The data visualization system 132 may take the user to a different page. For example, if a user clicks on bug ID, the data visualization system 132 may return the user interface 300 showing the game environment map and the video associated with that bug ID.

The user interface 400 can include a filtering tool 410. The filtering tool 410 can be a part of the interface control module 260 (such as, for example, as described with reference to FIG. 2). The filtering tool 410 may communicate with one or more systems and/or modules and display a subset of the telemetry data. For example, a user may choose to see only telemetry data associated with an enemy character. Upon receiving the filtering criteria, the telemetry data module 430 can display the telemetry data accordingly. Similarly, a user may use the filtering tool to only show an event's description and session ID in module 430.

The user interface 400 can also include a search tool 420. As shown in FIG. 4, a user can input a session ID into the search tool 420 and receive all telemetry data associated with that session ID.

Example Process of Associating Telemetry Data with Video Data

Figure 5:
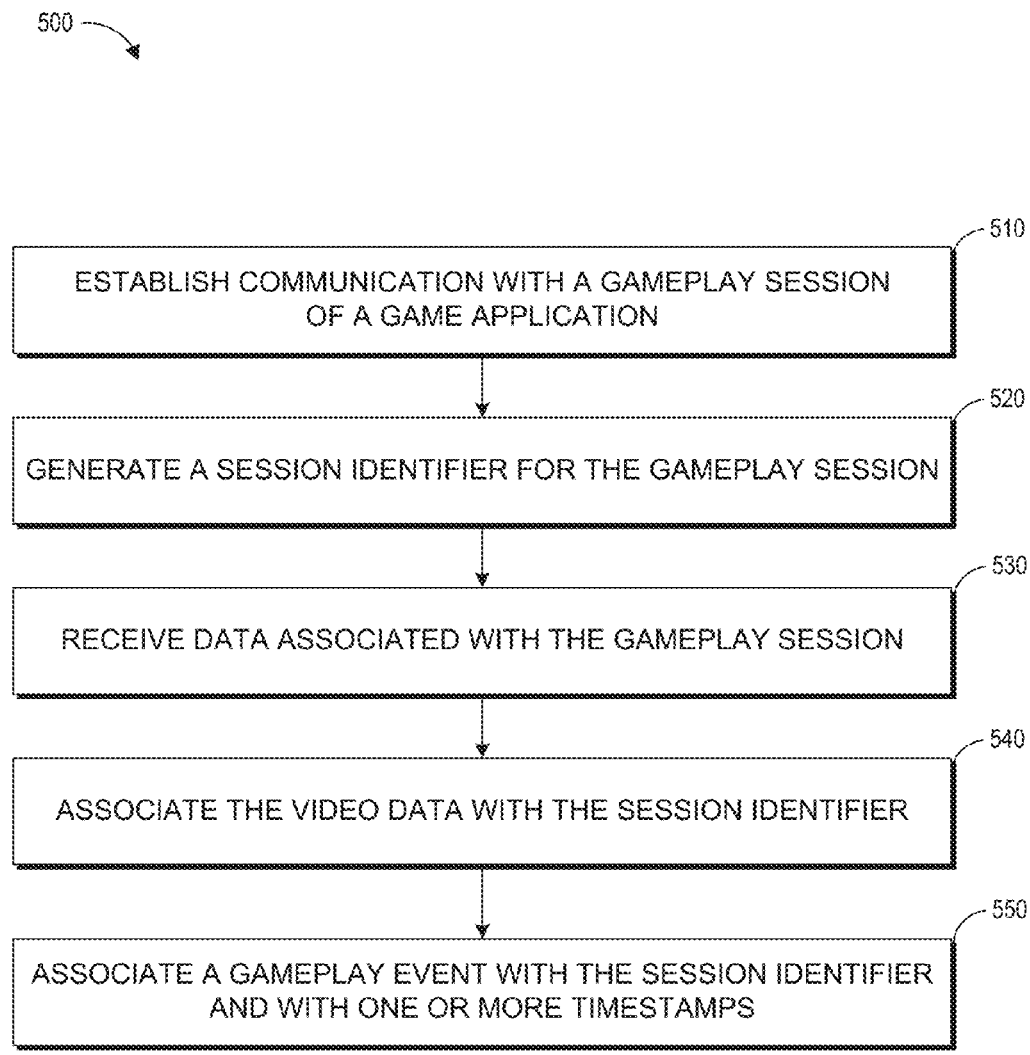
FIG. 5 illustrates a flowchart of an embodiment of associating telemetry data with video data.

FIG. 5 illustrates an embodiment of a flowchart for a method of associating telemetry data with video data. The process 500 can be implemented by any system that can decode and stream content within a game environment during runtime of a game application. For example, the process 500, in whole or in part, can be implemented by a game application 104, a game metric analysis system 130, an user computing system 103, a player computing system 102, an interactive computing system 120, or other application module. Although any number of systems, in whole or in part, can implement the process 500, to simplify discussion, the process 500 will be described with respect to particular systems. Further, although embodiments of the process 500 may be performed with respect to variations of systems comprising various game application environments, to simplify discussion, the process 500 will be described with respect to the interactive computing system 120.

In process 500, at block 510, the interactive computing system 120 can establish electronic communication a gameplay session of the game application on the player computing system 102. In some embodiments, the data acquisition system 150 and/or the interactive computing system 120 can establish communication with the gameplay session. The player computing system 102 may execute a game application 104 that runs the gameplay session.

At block 520, a session ID is generated for the gameplay session. The session ID may be generated by the interactive computing system 120 or the player computing system 102. In certain embodiments, the session ID may include information unique to the player computing system 102, such as the IP address associated with the player computing system 102.

At block 530, the interactive computing system can receive data associated with the gameplay session. The data associated with the gameplay session may include video data, telemetry data, system data, player profile data, and/or other data associated with the execution of the game application. In some embodiments, separate systems can individually communicate with the game application and acquire specific data associated with the gameplay session. For example, the video acquisition system 144 can acquire video data, the telemetry data acquisition system 134 can acquire telemetry data, the player data acquisition system 142 can acquire player profile data, and/or other systems can be responsible for acquiring different types of data. Each system can store their respective data in data stores associated with the respective system.

The video data can include with timestamps for the gameplay session. For example, the video data may generate timestamps associated with each frame of video data received during the gameplay session. The interactive computing system 120 can associate the video data with the session ID. Similarly, the interactive computing system 120 can associate the received telemetry data with the session ID. The interactive computing system 120 may store the recorded video in data store 124.

At block 540, the interactive computing system 120 can associate the session ID with the video data of the gameplay session. For example, the video acquisition system 144 can associate the session ID with the video data received from the gameplay session.

At block 550, the interactive computing system 120 can associate an event in the gameplay session with the session ID of the gameplay session and one or more timestamps. The telemetry data acquisition system 134 can associate the session ID with the telemetry data received from the gameplay session. An event may be associated with one or more timestamps. The session ID and timestamp information associated with an event can be used to retrieve video data associated with the gameplay event.

Example Process of Game Analysis

Figure 6:
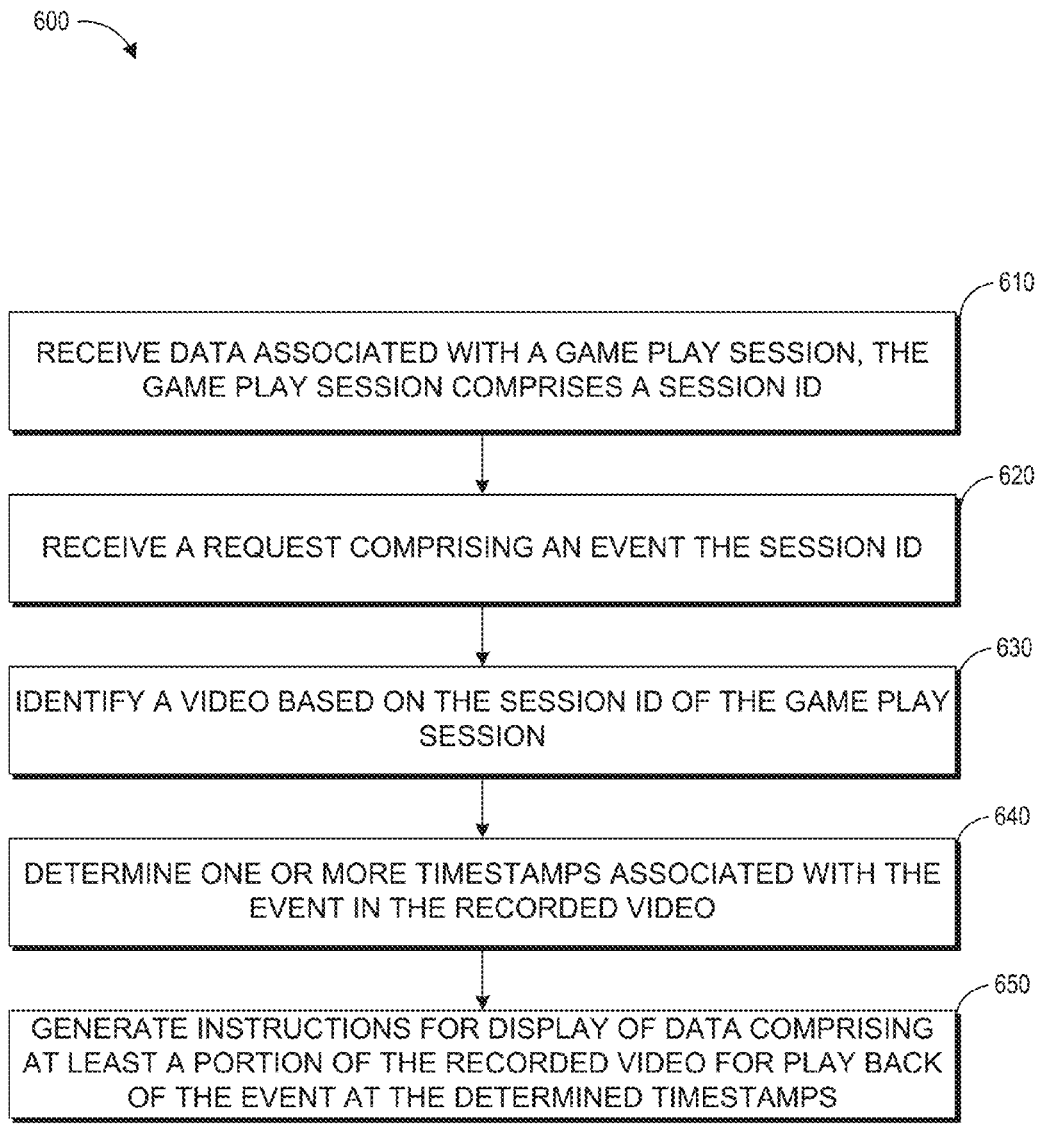
FIG. 6 illustrates a flowchart of an embodiment of a game metric analysis process.

FIG. 6 illustrates a flowchart of an embodiment for a game metric analysis process. The process 600 can be implemented by any system that can decode and stream content within a game environment during runtime of a game application. For example, the process 600, in whole or in part, can be implemented by a game application 104, a game metric analysis system 130, an user computing system 103, a player computing system 102, an interactive computing system 120, or other application module. Although any number of systems, in whole or in part, can implement the process 600, to simplify discussion, the process 600 will be described with respect to particular systems. Further, although embodiments of the process 600 may be performed with respect to variations of systems comprising various game application environments, to simplify discussion, the process 600 will be described with respect to the interactive computing system 120.

At block 610 of process 600, the interactive computing system 120 can receive data associated with the gameplay session. The gameplay session can include a session ID. The data associated with the session ID can include video data, telemetry data, system data, player profile data, and/or other data associated with the session ID.

At block 620, the interactive computing system 120 can receive a request including an event and a session ID. The request may come from the user computing system 103 (shown in FIG. 1). The event may be identified by one or more event identifiers described herein. The event may have an event ID, such as a bug ID, in addition to the session ID.

At block 630, the interactive computing system 120 can locate video data associated with the gameplay session using the session ID provided in the user's request. The video data may be a complete video that includes what was previously recorded and stored by the video acquisition system. In some embodiments, the video data may be a portion of a video data that is concurrently being recorded, such as, for example, by the video acquisition system.

At block 640, the interactive computing system 120 can identify one or more timestamps associated with the occurrence of the event during the gameplay session. The event may include can include one or more timestamps specific to the event. The event may be an individual event, such as a user input, that is associated with a single timestamp based on when the user input was received by the game application. The event may be an event that occurs over specified time frame, such as a cut scene. The timestamps may indicate the initiation of the event, the end of the event, and/or interim periods of time during the occurrence of the event. The interactive computing system 120 can determine the portion of the video corresponding to the event based on the timestamp information. For example, the interactive computing system may identify a time within the video that is a defined time before the time indicated on the timestamp (such as, for example, 1 second before the timestamp).

At block 650, the interactive computing system 120 can generate instructions to display data associated with the event. The instructions may be transmitted to the data visualization system 132 of the user computing system 103. The data may include telemetry data associated with the event, event description, one or more search criteria, or the like. The instructions may instruct the data visualization system 132 to play the recorded video from a timestamp where the event begins.

In some implementations, a portion of the data may be stored locally (instead of stored with interactive computing system 120). The interactive computing system 120 may send instructions to the data visualization system 132 to retrieve and display some of the data. For example, when a video of the gameplay session is not streamed to the server, the interactive computing system 120 can send instructions to cause the data visualization system 132 to play the video from a certain timestamp.

Although process 600 is described with respect to identifying one event, it should be noted that the examples are not limiting. The process 600 can identify multiple events, associate those events with relevant data, and return a video where the timestamps provide links to multiple events.

Overview of Computing Device

Figure 7:
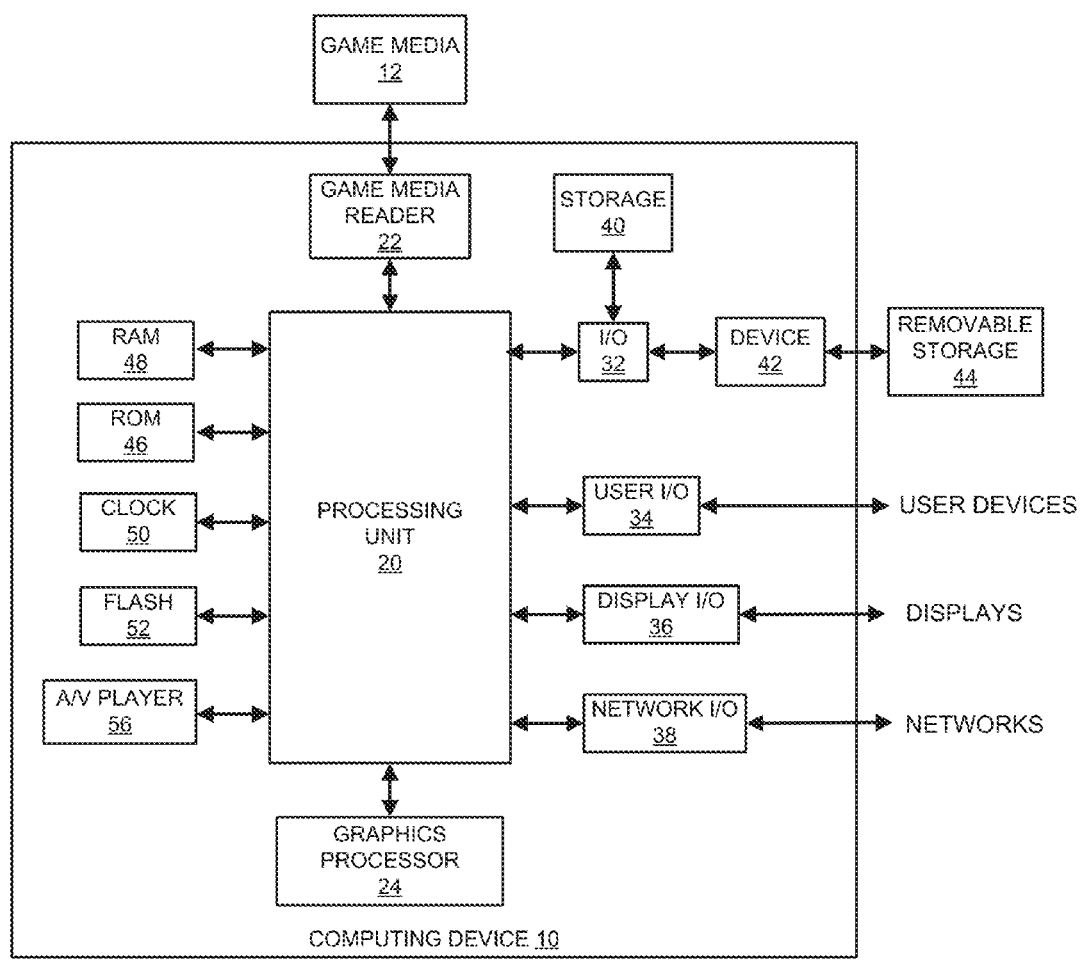
FIG. 7 illustrates an embodiment of a computing device.

FIG. 7 illustrates an embodiment of computing device 10 according to the present disclosure. Other variations of the computing device 10 may be substituted for the examples explicitly presented herein, such as removing or adding components to the computing device 10. The computing device 10 may include a game device, a smart phone, a tablet, a personal computer, a laptop, a smart television, a car console display, a server, and the like. The computing device 10 may also be distributed across multiple geographical locations. For example, the computing device 10 may be a cluster of cloud-based servers.

As shown, the computing device 10 includes a processing unit 20 that interacts with other components of the computing device 10 and also external components to computing device 10. A game media reader 22 is included that communicates with game media 12. The game media reader 22 may be an optical disc reader capable of reading optical discs, such as CD-ROMs or DVDs, or any other type of reader that can receive and read data from game media 12. One or more of the computing devices may be used to implement one or more of the systems disclosed herein.

Computing device 10 may include a separate graphics processor 24. In some cases, the graphics processor 24 may be built into the processing unit 20. In some such cases, the graphics processor 24 may share Random Access Memory (RAM) with the processing unit 20. Alternatively, or in addition, the computing device 10 may include a discrete graphics processor 24 that is separate from the processing unit 20. In some such cases, the graphics processor 24 may have separate RAM from the processing unit 20. Computing device 10 might be a handheld game application device, a dedicated game console computing system, a general-purpose laptop or desktop computer, a smart phone, a tablet, a car console, or other suitable system.

Computing device 10 also includes various components for enabling input/output, such as an I/O 32, a user I/O 34, a display I/O 36, and a network I/O 38. I/O 32 interacts with storage element 40 and, through a device 42, removable storage media 44 in order to provide storage for computing device 10. Processing unit 20 can communicate through I/O 32 to store data, such as game state data and any shared data files. In addition to storage 40 and removable storage media 44, computing device 10 is also shown including ROM (Read-Only Memory) 46 and RAM 48. RAM 48 may be used for data that is accessed frequently, such as when a game is being played or the fraud detection is performed.

User I/O 34 is used to send and receive commands between processing unit 20 and user devices, such as game controllers. In some embodiments, the user I/O 34 can include a touchscreen input. The touchscreen can be capacitive touchscreen, a resistive touchscreen, or other type of touchscreen technology that is configured to receive user input through tactile inputs from the player. Display I/O 36 provides input/output functions that are used to display images from the game being played. Network I/O 38 is used for input/output functions for a network. Network I/O 38 may be used during execution of a game, such as when a game is being played online or being accessed online and/or application of fraud detection, and/or generation of a fraud detection model.

Display output signals produced by display I/O 36 comprise signals for displaying visual content produced by computing device 10 on a display device, such as graphics, user interfaces, video, and/or other visual content. Computing device 10 may comprise one or more integrated displays configured to receive display output signals produced by display I/O 36. According to some embodiments, display output signals produced by display I/O 36 may also be output to one or more display devices external to computing device 10.

The computing device 10 can also include other features that may be used with a game, such as a clock 50, flash memory 52, and other components. An audio/video player 56 might also be used to play a video sequence, such as a movie. It should be understood that other components may be provided in computing device 10 and that a person skilled in the art will appreciate other variations of computing device 10.

Program code can be stored in ROM 46, RAM 48 or storage 40 (which might comprise a hard disk, other magnetic storage, optical storage, other non-volatile storage or a combination or variation of these). Part of the program code can be stored in ROM that is programmable (ROM, PROM, EPROM, EEPROM, and so forth), part of the program code can be stored in storage 40, and/or on removable media such as game media 12 (which can be a CD-ROM, cartridge, memory chip or the like, or obtained over a network or other electronic channel as needed). In general, program code can be found embodied in a tangible non-transitory signal-bearing medium.

Random access memory (RAM) 48 (and possibly other storage) is usable to store variables and other game and processor data as needed. RAM 48 is used and holds data that is generated during the execution of an application and portions thereof might also be reserved for frame buffers, application state information, and/or other data needed or usable for interpreting user input and generating display outputs. Generally, RAM 48 is volatile storage and data stored within RAM 48 may be lost when the computing device 10 is turned off or loses power.

As computing device 10 reads game media 12 and provides an application, information may be read from game media 12 and stored in a memory device, such as RAM 48. Additionally, data from storage 40, ROM 46, servers accessed via a network (not shown), or removable storage media 44 may be read and loaded into RAM 48. Although data is described as being found in RAM 48, it will be understood that data does not have to be stored in RAM 48 and may be stored in other memory accessible to processing unit 20 or distributed among several media, such as game media 12 and storage 40.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated, via software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence or can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A system comprising:
    at least one data store comprising gameplay data associated with a game application; and
    a remote computing system in electronic communication with the at least one data store and configured to execute a game application analysis system, the game application analysis system configured to:
        establish electronic communication with a gameplay session of a game application executing on a first computing system;
        generate a session identifier for the gameplay session;
        receive video data associated with the gameplay session;
        associate the video data with the session identifier of the gameplay session, wherein the video data comprises a plurality of timestamps;
        receive telemetry data associated with the gameplay session, wherein the video data associated with the gameplay session is stored separately from the telemetry data associated with the gameplay session;
        associate the telemetry data with the session identifier of the gameplay session, wherein the telemetry data comprises a plurality of gameplay events recorded during the gameplay session, wherein each event of the plurality of gameplay events is associated with at least one timestamp of the plurality of timestamps;
        provide, to a second computing system, graphical user interface data for displaying an error debugging graphical user interface for the game application;
        receive, via the graphical user interface, a request for video data associated with a gameplay event of the plurality of gameplay events from the second computing system, wherein the gameplay event includes one or more errors associated with execution of the game play computer code during a gameplay session;

identify the session identifier associated with the gameplay event;

identify a timestamp associated with the session identifier and the gameplay event;

identify first video data associated with the gameplay session based, at least in part, on the session identifier;

identify the first video data corresponding to the gameplay event based on the timestamp; and provide, to the second computing system, at least a portion of the identified first video data associated with the gameplay session corresponding to the gameplay event.

2. The system of claim 1, wherein the at least one data store comprises a first data store and a second data store, wherein the video data is stored in the first data store and the telemetry data is stored in the second data store.

3. The system of claim 1, wherein the one or more errors are associated with at least one of a decoded call stack or a crash identifier.

4. The system of claim 1, wherein the video data further comprises audio data associated with the gameplay session.

5. The system of claim 1, wherein each of the plurality of timestamps comprises a start time of the gameplay session and an end time of the gameplay session.

6. The system of claim 1, wherein the game application analysis system is further configured to receive the request associated with a gameplay event before the gameplay session ends.

7. The system of claim 1, wherein the game application analysis system is further configured to stream the video data to the second computing system.

8. The system of claim 1, wherein the telemetry data comprises location data associated with a character within a game environment of the game application.

9. The system of claim 1, wherein the game application analysis system is further configured to generate instructions to display telemetry data associated with the gameplay event.

10. A computer-implemented method comprising:
under control of a computer system comprising computer hardware, the computer system configured with computer executable instructions:
establishing electronic communication with a gameplay session of a game application executing on a first computing system;
generating a session identifier for the gameplay session;
receiving gameplay data associated with the gameplay session, wherein the gameplay data comprises video data and telemetry data, wherein the video data is stored separately from the telemetry data;
associating the video data with the session identifier of the gameplay session;
associating the telemetry data with the session identifier of the gameplay session, wherein the telemetry data comprises a plurality of gameplay events recorded during the gameplay session, wherein each event of the plurality of gameplay events is associated with at least one timestamp of the gameplay session;
providing, to a second computing system, graphical user interface data for displaying an error debugging graphical user interface for the game application;
receiving, via the graphical user interface, a request for video data associated with a gameplay event of the plurality of gameplay events from the second computing system, wherein the gameplay event includes one or more errors associated with game play computer code;
identify the session identifier associated with the gameplay event;
identify a timestamp associated with the session identifier and the gameplay event;
identifying first video data associated with the gameplay session based, at least in part, on the session identifier;
identify the first video data corresponding to the gameplay event based on the timestamp; and
providing, to the second computing system, the identified video data associated with the gameplay session corresponding to the gameplay event.

11. The method of claim 10, further comprising generating instructions to display telemetry data associated with the gameplay event.

12. The method of claim 10, wherein receiving the request associated with a gameplay event occurs before the gameplay session ends.

13. The method of claim 10, wherein providing the video data associated with the gameplay session comprises streaming the video data to the second computing system.

14. The method of claim 10, further comprising:
receiving a filtering criteria from the second computing system; and
filtering telemetry data associated with the session identifier based at least in part on the filtering criteria.

15. The method of claim 14, wherein the request further comprises a bug report associated with executing a game application during the gameplay session.

16. A non-transitory computer-readable storage medium having stored thereon instructions that, when executed, direct a computing system to implement a game application analysis system, the game application analysis system configured to:
establish electronic communication with a gameplay session of a game application executing on a first computing system;
generate a session identifier for the gameplay session;
receive gameplay data associated with the gameplay session, wherein the gameplay data comprises video data and telemetry data, wherein the video data is stored separately from the telemetry data;
associate the video data with the session identifier of the gameplay session;
associate the telemetry data with the session identifier of the gameplay session, wherein the telemetry data comprises a plurality of gameplay events recorded during the gameplay session, wherein each event of the plurality of gameplay events is associated with at least one timestamp of the gameplay session;
provide, to a second computing system, graphical user interface data for displaying an error debugging graphical user interface for the game application;
receive, via the graphical user interface, a request for video data associated with a gameplay event of the plurality of gameplay events from the second computing system, wherein the gameplay event includes one or more errors associated with game play computer code;
identify the session identifier associated with the gameplay event;

identify a timestamp associated with the session identifier and the gameplay event;

identify first video data associated with the gameplay session based, at least in part, on the session identifier;

identify the first video data corresponding to the gameplay event based on the timestamp; and provide, to the second computing system, the identified video data associated with the gameplay session corresponding to the gameplay event.

17. The non-transitory computer-readable storage medium of claim 16, wherein the event comprises one or more of the following: a bug in computer code, a crash of the game application, or a user configured event.

18. The non-transitory computer-readable storage medium of claim 16, wherein the gameplay data associated with the gameplay session comprises at least user profile data or system data.

19. The non-transitory computer-readable storage medium of claim 16, wherein the session identifier is automatically generated for a gameplay session.

* * * * *